United States Patent
Seto

(10) Patent No.: US 10,988,404 B2
(45) Date of Patent: Apr. 27, 2021

(54) ULTRAVIOLET-SHIELDING GLASS SHEET AND VEHICLE WINDOW PANE USING THE GLASS SHEET

(71) Applicant: Nippon Sheet Glass Company, Limited, Tokyo (JP)

(72) Inventor: Hiromitsu Seto, Hyogo (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 140 days.

(21) Appl. No.: 16/305,763

(22) PCT Filed: May 30, 2017

(86) PCT No.: PCT/JP2017/020153
§ 371 (c)(1),
(2) Date: Nov. 29, 2018

(87) PCT Pub. No.: WO2017/209148
PCT Pub. Date: Dec. 7, 2017

(65) Prior Publication Data
US 2020/0017397 A1    Jan. 16, 2020

(30) Foreign Application Priority Data
May 30, 2016   (JP) .......................... JP2016-107832

(51) Int. Cl.
| | |
|---|---|
| C03C 3/087 | (2006.01) |
| B60J 1/00 | (2006.01) |
| C03C 3/093 | (2006.01) |
| C03C 4/02 | (2006.01) |
| G02B 5/20 | (2006.01) |
| C03B 27/04 | (2006.01) |

(52) U.S. Cl.
CPC ............. C03C 3/087 (2013.01); B60J 1/00 (2013.01); C03B 27/04 (2013.01); C03C 3/093 (2013.01); C03C 4/02 (2013.01); G02B 5/208 (2013.01); C03B 2201/40 (2013.01); C03C 2201/40 (2013.01)

(58) Field of Classification Search
None
See application file for complete search history.

(56) References Cited

U.S. PATENT DOCUMENTS

| | | | |
|---|---|---|---|
| 5,446,007 A | 8/1995 | Krashkevich et al. | |
| 6,071,840 A | 6/2000 | Sasage et al. | |
| 6,395,660 B1 | 5/2002 | Seto et al. | |
| 2004/0038799 A1 | 2/2004 | Landa et al. | |
| 2004/0071982 A1* | 4/2004 | Seto .................. | C03C 3/087 428/426 |
| 2008/0149902 A1* | 6/2008 | Teyssedre ............... | C03C 3/095 252/587 |
| 2009/0088309 A1* | 4/2009 | Niida .................... | C03C 3/085 501/59 |
| 2012/0038976 A1 | 2/2012 | Kodaira et al. | |
| 2015/0166400 A1 | 6/2015 | Yamamoto | |
| 2015/0307389 A1* | 10/2015 | He ........................ | C03C 4/02 359/361 |
| 2016/0194239 A1* | 7/2016 | Seto .................... | C03C 4/082 501/64 |
| 2016/0229735 A1 | 8/2016 | Akada | |
| 2017/0174553 A1* | 6/2017 | Akada .................. | C03C 4/02 |
| 2017/0327409 A1* | 11/2017 | Seto ..................... | C03C 3/095 |

FOREIGN PATENT DOCUMENTS

| | | |
|---|---|---|
| CN | 104640820 | 5/2015 |
| EP | 2546207 | 1/2013 |
| JP | H08245238 A | 9/1996 |
| JP | H10114540 A | 5/1998 |
| JP | 2000247679 A | 9/2000 |
| JP | 2002508293 A | 3/2002 |
| JP | 2011136846 A | 7/2011 |
| WO | 9717303 A1 | 5/1997 |
| WO | 9928254 A1 | 6/1999 |
| WO | 2010131744 A1 | 11/2010 |
| WO | 2015088026 A1 | 6/2015 |

OTHER PUBLICATIONS

International Search Report issued for International Patent Application No. PCT/JP2017/020153, dated Aug. 29, 2017, 5 pages including English translation.
Extended European Search Report issued for European Patent Application No. 17806701.3, dated Jan. 16, 2020, 6 pages.

* cited by examiner

*Primary Examiner* — Derek S. Chapel
(74) *Attorney, Agent, or Firm* — Hamre, Schumann, Mueller & Larson, P.C.

(57) ABSTRACT

The present invention provides a glass sheet having a good property of blocking transmission of ultraviolet light, having a low to moderate visible transmittance, being relatively thin, being capable of substantially blocking transmission of solar ultraviolet light, and also having a good solar shielding property. The glass sheet of the present invention has a thickness of 1 to 5 mm, a Tuv 380 of 1.5% or less, a Tuv 400 of 2.5% or less, a visible transmittance (YA) of 5 to 40%, and a solar transmittance (TG) of 5 to 45%, and is formed from a glass composition, wherein the glass composition includes: 1.0 to 5.0 wt % $T\text{-}Fe_2O_3$; 1.0 to 5.0 wt % $TiO_2$; and 50 to 600 wt. ppm CoO as coloring components in addition to predetermined base composition, a FeO ratio is 5 to 40%, and the sum of $T\text{-}Fe_2O_3$ multiplied by 2 and $TiO_2$ is 7.0% or more.

25 Claims, No Drawings

ULTRAVIOLET-SHIELDING GLASS SHEET AND VEHICLE WINDOW PANE USING THE GLASS SHEET

TECHNICAL FIELD

The present invention relates to a relatively thin glass sheet formed from a glass composition, the glass sheet having a very low ultraviolet transmittance, being capable of substantially blocking transmission of ultraviolet light, and having a low to moderate visible transmittance. The present invention further relates to a window pane for vehicles and buildings, in particular for vehicles.

BACKGROUND ART

Window panes for vehicles and buildings are produced using soda-lime glass. Such window panes are required to have the function of shielding against ultraviolet light to prevent a person or article in a vehicle or room from experiencing sunburn or color fading.

Concerning the ultraviolet-absorbing function of soda-lime glass, a technique based on absorption by ferric oxide and absorption by an optionally added ultraviolet-absorbing component such as titanium oxide ($TiO_2$) or cerium oxide ($CeO_2$) has been disclosed (Patent Literature 1).

However, the glass composition disclosed in Patent Literature 1 can only exhibit an ultraviolet transmittance, which is a measure of the ultraviolet-shielding function, of at most 1.6% or less when the glass thickness is 4 mm. Window panes for vehicles are particularly required to be lightweight, and glass sheets for use in such window panes should be thin. If a glass sheet with a thickness of less than 4 mm is formed from the glass composition of Patent Literature 1, the glass sheet will have an even lower ultraviolet-shielding ability.

To solve the above problem, techniques have been disclosed which do not rely on the ultraviolet-shielding ability of a glass sheet itself but rather on the ultraviolet-shielding ability of a film (ultraviolet-shielding film) formed on the glass sheet (Patent Literatures 2 and 3). The coated glass sheets disclosed in Patent Literatures 2 and 3 have an ultraviolet transmittance of less than 1% at a wavelength of 380 nm, which indeed demonstrates the achievement of high ultraviolet-shielding ability. However, the step of forming a coating on a glass sheet is necessary, and the production cost is inevitably increased compared to when a glass sheet can by itself achieve a satisfactory ultraviolet-shielding ability.

CITATION LIST

Patent Literature

Patent Literature 1: JP H10-114540 A
Patent Literature 2: JP 2011-136846 A
Patent Literature 3: WO 2010/131744 A1

SUMMARY OF INVENTION

Technical Problem

It is therefore an object of the present invention to provide a relatively thin glass sheet having a low to moderate visible transmittance, the glass sheet being capable of substantially blocking transmission of solar ultraviolet light and also having a good solar shielding property.

Solution to Problem

The present invention provides an ultraviolet-shielding glass sheet, having:
a thickness of 1 to 5 mm;
an ultraviolet transmittance (Tuv 380) as determined according to ISO 9050:1990 of 1.5% or less,
an ultraviolet transmittance (Tuv 400) as determined according to ISO 13837:2008 convention A of 2.5% or less,
a visible transmittance (YA) as measured using CIE standard illuminant A according to Japanese Industrial Standards (JIS) R 3106:1998 of 5 to 40%, and
a solar transmittance (TG) as determined according to JIS R 3106:1998 of 5 to 45%,
the ultraviolet-shielding glass sheet including a glass composition, wherein
the glass composition includes base composition including:
65 to 85 wt % $SiO_2$;
0 to 5 wt % $B_2O_3$;
0 to 5 wt % $Al_2O_3$;
0 to 20 wt % $MgO$;
0 to 20 wt % $CaO$;
10 to 20 wt % $Na_2O$;
0 to 5 wt % $K_2O$; and
0 to 0.5 wt % $SO_3$,
the glass composition includes, as coloring components:
1.0 to 5.0 wt % $T\text{-}Fe_2O_3$ representing total iron oxide calculated as $Fe_2O_3$;
1.0 to 5.0 wt % $TiO_2$; and
50 to 600 wt. ppm cobalt oxide calculated as CoO,
the glass composition has a FeO ratio of 5 to 40%, the FeO ratio representing a weight ratio of FeO calculated as $Fe_2O_3$ to the $T\text{-}Fe_2O_3$, and
the glass composition satisfies $2\times[T\text{-}Fe_2O_3]+[TiO_2]\geq 7.0$ wherein $[T\text{-}Fe_2O_3]$ represents the content of the $T\text{-}Fe_2O_3$ in terms of wt % and $[TiO_2]$ represents the content of the $TiO_2$ in terms of wt %.

The present invention also provides a vehicle window pane including the ultraviolet-shielding glass sheet of the present invention.

Advantageous Effects of Invention

The present invention provides an ultraviolet-shielding glass sheet capable, without the aid of an additional coating, of substantially blocking transmission of solar ultraviolet light and exhibiting a solar shielding property.

DESCRIPTION OF EMBODIMENTS

The following describes embodiments of the present invention but is not intended to limit the present invention to the embodiments described. The signs "%" and "ppm" used hereinafter indicate the contents of various components in terms of weight unless otherwise specified, and the ratios between the contents are also expressed in terms of weight. "YA" refers to a visible transmittance as measured according to JIS R 3106:1998 using CIE standard illuminant A, "TG" refers to a solar transmittance as measured according to JIS R 3106:1998, "Tuv 380" refers to an ultraviolet transmittance as determined according to ISO 9050:1990, and "Tuv 400" refers to an ultraviolet transmittance as determined according to ISO 13837:2008 convention A. The term "% T 1500" refers to a light transmittance as measured at a wavelength of 1500 nm. "DW" refers to a dominant wavelength as measured using CIE standard illuminant C, "Pe"

refers to an excitation purity as measured using CIE standard illuminant C, and "a*" and "b*" refer to chromatic indices (chromatic coordinates) in the CIE 1976 (L*, a*, b*) color space (CIELAB) as defined in JIS Z 8781-4:2013.

"RO" is used herein to collectively refer to MgO, CaO, SrO, and BaO, while "$R_2O$" is used herein to collectively refer to $Li_2O$, $Na_2O$, and $K_2O$. In addition, the term "substantially free" is used herein to mean that the content of the component of interest is less than 0.1 wt %, preferably less than 0.05 wt %, and particularly preferably less than 0.01 wt %.

[Components in Base Composition]

First, components in base composition in a glass composition forming a glass sheet of the present invention will be described.

($SiO_2$)

$SiO_2$ is a main component forming the glass structure. Given only the durability of the glass composition, $SiO_2$ may be contained in an amount of about 65% or more. If the content of $SiO_2$ is too high, melting of the glass material is difficult. The content of $SiO_2$ must thus be 85% or less. To achieve as low an ultraviolet transmittance as possible and at the same time a YA of 10 to 30%, the content of $SiO_2$ is preferably 71% or less.

($B_2O_3$)

$B_2O_3$ is not an essential component, but may be contained in an amount of up to 5%, for example, as a melting aid. If the content of $B_2O_3$ is too high, its volatility may cause production problems. The content of $B_2O_3$ is preferably less than 3.0% and particularly preferably less than 2.0%. The glass composition may be substantially free of $B_2O_3$.

($Al_2O_3$)

The content of $Al_2O_3$ is adjusted to the range of 0 to 5%. When the content of RO is low, the content of $Al_2O_3$ is preferably 1.0% or more and particularly preferably 1.2% or more to compensate for a decrease in the durability of the glass composition. However, if the content of $Al_2O_3$ is too high, melting of the glass material is likely to be difficult. In addition, $Al_2O_3$ reduces the thermal expansion coefficient. The content of $Al_2O_3$ is therefore preferably 3.0% or less when the glass composition is to be thermally strengthened (thermally tempered).

(MgO)

The content of MgO is adjusted to the range of 0 to 20%. MgO is a component that contributes to an increase in the durability of the glass composition and that can be used to adjust the devitrification temperature and viscosity of the composition. If the content of MgO is too high, the devitrification temperature may be so increased as to make impossible mass production by a float process. Specifically, the content of MgO is preferably 3 to 10%.

(CaO)

The content of CaO is adjusted to the range of 0 to 20%. CaO is also a component that contributes to an increase in the durability of the glass composition and that can be used to adjust the devitrification temperature and viscosity of the composition, although the extent of the effect of CaO is different from that of MgO. If the content of CaO is too low, a glass melt may have too high a viscosity which adversely affects the refining of the melt. The content of CaO is preferably 5 to 15%.

(SrO and BaO)

SrO and BaO are not essential components, but may each be contained in an amount of up to 1.0%, preferably in an amount of up to 0.5%, as components contributing, for example, to an increase in the durability of the glass composition. Addition of SrO and BaO requires the use of source materials that are more expensive than those for other components such as CaO. BaO should be carefully handled. The glass composition may therefore be substantially free of SrO and BaO.

(RO)

The content of RO (the total content of MgO, CaO, SrO, and BaO) is 20% or less and preferably 15% or less. The lower limit of the content of RO is not particularly defined. The content of RO is typically adjusted to 5% or more or even 10% or more to obtain the above preferred effects of MgO and CaO.

The glass composition may be substantially free of SrO and BaO.

($Li_2O$, $Na_2O$, and $K_2O$)

$Li_2O$, $Na_2O$, and $K_2O$, which are alkali metal oxides, are components serving as facilitators that help melt the glass material. $Na_2O$ is an alkali metal oxide the use of which is preferred in terms of production cost. The content of $Na_2O$ is adjusted to the range of 10 to 20%. The content of $Na_2O$ is preferably 10 to 15%.

$K_2O$ is an optional component, and may be contained in an amount of up to 5%, preferably in an amount of up to 2%. The content of $K_2O$ may be, for example, 0.5 to 2.0%.

$Li_2O$ is also an optional component, and may be contained in an amount of up to 1.0%. The glass composition may be substantially free of $Li_2O$.

($R_2O$)

The content of $R_2O$ (the total content of $Li_2O$, $Na_2O$, and $K_2O$) is adjusted to the range of 10 to 20%. The content of $R_2O$ is preferably in the range of 10 to 15%. If the content of $R_2O$ is too high, the durability of the glass composition may decrease.

($SO_3$)

$SO_3$ is an optional component that may be contained in an amount of up to 0.5% to facilitate refining of glass. The content of $SO_3$ is preferably in the range of 0.05 to 0.5%. If the content of $SO_3$ is too high, $SO_2$ resulting from decomposition of $SO_3$ may remain in the form of bubbles in the glass composition, or bubbles may be produced by reboiling. The content of $SO_3$ is more preferably 0.05 to 0.25%. $SO_3$ is typically incorporated into the glass composition by adding to the glass material a sulfuric acid salt as a component serving as a refining agent.

[Coloring Components]

Various coloring components in the glass composition forming the glass sheet of the present invention will be described.

(Iron Oxide)

Iron oxide is present in the form of $Fe_2O_3$ or FeO in the glass composition. $Fe_2O_3$ has the function of absorbing ultraviolet light, while FeO has the function of absorbing near-infrared light. In the glass composition, the content of T-$Fe_2O_3$, which represents the total of these forms of iron oxide calculated as $Fe_2O_3$, is adjusted to the range of 1.0 to 5.0%. If the content of T-$Fe_2O_3$ is too high, radiant heat of flame for melting the glass material is so significantly absorbed by the upper part of the molten glass that the heat fails to reach the bottom of the melting furnace and heat the molten glass sufficiently. The content of T-$Fe_2O_3$ is, for example, 1.0 to 4.0%, even 1.0 to 3.0%, preferably more than 2.2% and 3.0% or less, more preferably 2.3% or more and 3.0% or less, even more preferably 2.4 to 3.0%, particularly preferably more than 2.4% and 3.0% or less, and more particularly preferably 2.5 to 3.0%. The content of T-$Fe_2O_3$ may be 2.0 to 2.4% or even 2.0% or more and less than 2.4%.

The amount of T-Fe$_2$O$_3$ contained in the ultraviolet-shielding glass sheet is preferably 12.5 to 62.5 mg, more preferably 12.5 to 35.0 mg, particularly preferably 12.5 to 25.0 mg, and more particularly preferably 12.5 to 20.0 mg, per cm$^2$ of the glass sheet. The amount of T-Fe$_2$O$_3$ may be 12.5 mg or more and less than 18.0 mg or even 18.0 to 20.0 mg per cm$^2$ of the glass sheet. The amount of a component (for example, T-Fe$_2$O$_3$) per cm$^2$ of the glass sheet is determined, specifically, as the amount of the component contained in the glass composition per unit volume defined by a 1-cm$^2$ surface of the glass sheet and the thickness of the glass sheet.

The ratio (FeO ratio) of FeO calculated as Fe$_2$O$_3$ to T-Fe$_2$O$_3$ is adjusted to 5 to 40%. If the FeO ratio is too high, silica-rich streaks or silica scum is likely to be formed in the molten glass material. However, a high FeO ratio is advantageous in enhancing the near-infrared absorbing function. The FeO ratio is preferably 20 to 35%, more preferably 22 to 32%, and particularly preferably 23 to 30%, and may be, in some cases, 26 to 28%. The FeO ratio may be 18 to 28%, particularly 22 to 24%.

(TiO$_2$)

TiO$_2$ is one of the components responsible for the ultraviolet-absorbing function. TiO$_2$ has the function of adjusting the color of the glass from a bluish color to a greenish color when the FeO ratio is high. The content of TiO$_2$ is adjusted to the range of 1.0 to 5.0%. The content of TiO$_2$ is, for example, 1.0 to 4.0%, preferably 1.0 to 3.5%, more preferably 1.0 to 3.0%, even more preferably 1.5 to 3.0%, particularly preferably 1.8 to 3.0%, and more particularly preferably 1.9 to 3.0%. The content of TiO$_2$ may be, in some cases, more than 2.0% and 3.0% or less, even 2.1% or more and 3.0% or less, and particularly more than 2.2% and 3.0% or less. The content of TiO$_2$ may be, for example, 1.0 to 2.2%, or even 1.0 to 2.0%.

The amount of TiO$_2$ contained in the ultraviolet-shielding glass sheet is preferably 12.5 to 62.5 mg, more preferably 12.5 to 35.0 mg, particularly preferably 12.5 to 25.0 mg, and more particularly preferably 12.5 to 22.0 mg, per cm$^2$ of the glass sheet. The amount of TiO$_2$ may be 12.5 mg or more and less than 16.0 mg or 16.0 to 22.0 mg per cm$^2$ of the glass sheet.

(CeO$_2$)

CeO$_2$ is also one of the components responsible for the ultraviolet-absorbing function. However, addition of CeO$_2$ causes an increase in materials cost. The glass composition may be substantially free of CeO$_2$. When CeO$_2$ is added, the content of CeO$_2$ is preferably 0 to 1.5% and more preferably 0 to 1%.

(2× [T-Fe$_2$O$_3$]+[TiO$_2$]; Index A)

An index A expressed by 2×{T-Fe$_2$O$_3$}+{TiO$_2$} is adjusted to 7.0 or more. {T-Fe$_2$O$_3$} represents the content of the T-Fe$_2$O$_3$ in the glass composition in terms of wt % and {TiO$_2$} represents the content of the TiO$_2$ in the glass composition in terms of wt % is adjusted to 7.0 or more. The index A is preferably 7.1 or more, more preferably 7.3 or more, and particularly preferably 7.35 or more, and may be 7.4 or more. The index A is preferably 10.0 or less, more preferably 9.0 or less, and particularly preferably 8.0 or less, and may be 7.7 or less or even 7.5 or less. Appropriate adjustment of the index A allows both the ultraviolet shielding property and visible transmission property of the resulting glass sheet to be in preferred ranges.

(2×{T-Fe$_2$O$_3$}+{TiO$_2$}; Index B)

An index B expressed by 2×{T-Fe$_2$O$_3$}+{TiO$_2$} is preferably 43 to 105. {T-Fe$_2$O$_3$} represents the amount of the T-Fe$_2$O$_3$ in terms of mg per 1 cm$^2$ of the glass sheet and {TiO$_2$} represents the amount of the TiO$_2$ in terms of mg per 1 cm$^2$ of the glass sheet. The index B is preferably 45 or more and more preferably 47 or more, and may be 49 or more. The index B is preferably 70 or less and more preferably 60 or less, and may be 55 or less or even 53 or less. Appropriate adjustment of the index B also facilitates achieving both the ultraviolet shielding property and visible transmittance property.

(CoO)

CoO is one of the components for adjusting the transmission color of the glass sheet to a neutral color. CoO contributes to development of a color close to a neutral color when present with Se and/or NiO and Fe$_2$O$_3$, and also acts to control the visible transmittance. The content of CoO is adjusted to the range of 50 to 600 wt. ppm. If the content of CoO is too low, a desired color cannot be obtained, while if the content of CoO is too high, the resulting color becomes too bluish, and the visible transmittance decreases. The content of CoO is preferably 100 to 550 ppm, more preferably 200 to 500 ppm, and particularly preferably 250 to 450 ppm. Depending on the contents of other coloring components, the content of CoO may be 300 to 600 ppm or even more than 300 ppm and 600 ppm or less. For example, the appropriate content of CoO in a glass composition containing 1.0 to 2.2% TiO$_2$ and 2.4 to 3.0% T-Fe$_2$O$_3$ is 300 to 600 ppm and particularly 305 to 450 ppm. To be precise, the content of CoO is the content of cobalt oxide calculated as CoO.

The amount of CoO contained in the ultraviolet-shielding glass sheet is preferably 50 to 400 μg, more preferably 100 to 350 μg, and particularly preferably 120 to 300 μg, and may be, in some cases, 140 to 280 μg, per cm$^2$ of the glass sheet.

(NiO)

NiO is a component for adjusting the visible transmittance and decreasing the excitation purity similarly to CoO. An increase in the content of NiO decreases the visible transmittance and also makes the resulting color too greenish. The glass composition may be substantially free of NiO. The content of NiO is preferably 50 ppm or less and more preferably 30 ppm or less.

(Se)

Se is also a component for adjusting the transmission color of the glass sheet to a neutral color. Se develops a pink color which, coupled with a complementary color attributed to CoO, reduces the excitation purity. However, an increase in the content of Se decreases the visible transmittance. The glass composition may be substantially free of Se. The content of Se is preferably 50 ppm or less and more preferably 30 ppm or less. The content of Se is, for example, 5 to 50 ppm or 0 to 2 ppm. The Se content of 5 to 50 ppm is appropriate in a glass composition having a FeO ratio of 18 to 28%, and the Se content of 0 to 2 ppm is preferred when the FeO ratio is 22 to 32%.

[Other Minor Components]

The glass composition may further contain other minor components in addition to the various components described above. Examples of the minor components include Mo$_2$O$_3$, ZnO, and SnO$_2$. The total content of the minor components is preferably 5.0% or less, more preferably 2.0% or less, and particularly preferably 1.0% or less. The more preferred upper limit of the minor component content is 0.01% for Mo$_2$O$_3$, 0.1% for ZnO, and 1.0% for SnO$_2$. The content of ZnO is preferably 0 to 200 ppm and particularly preferably 0 to 100 ppm. The glass composition is preferably substantially free of any component other than the above various components and minor components, and may be substantially free of any component other than the above various components (SiO$_2$ through Se which have been sequentially described above).

Addition of a small amount of a zinc compound to a glass material batch makes it possible to effectively prevent generation of nickel sulfide. To achieve such a benefit of a zinc compound, the content of ZnO may be 5 to 200 ppm.

The content of an oxide of a metal that can have different valences in the glass composition is calculated herein by assuming that the metal of the oxide has a valence specified herein, with the exception of the content of iron oxide. The above-described exemplary ranges of the contents of the various components can be employed in any combination.

[Optical Properties and Impact of Thermal Tempering on Optical Properties]

A preferred embodiment of the present invention can provide a glass sheet having a thickness of 1 to 5 mm, for example, 1.0 to 3.5 mm, or even 1.5 to 3.0 mm, the glass sheet having a Tuv 380 as low as 1.5% or less, a Tuv 400 as low as 2.5% or less, and a TG of 45% or less and further having a YA of 5 to 40%, even 10 to 30%, or, as necessary, 12% or more and less than 20%, even 14.5% or more and less than 20%, or particularly 15% or more and less than 20%.

The wavelength range of solar ultraviolet light employed for ultraviolet transmittance measurement differs between Tuv 380 and Tuv 400. The Tuv 380 is measured in the wavelength range up to 380 nm, while the Tuv 400 is measured in the wavelength range up to 400 nm. That is, the Tuv 400 allows the ultraviolet-shielding performance to be evaluated in a longer-wavelength range than the Tuv 380 allows.

The glass sheet having the above-described properties and thickness can be produced on a mass production line which typically employs a float process. From the mass production line, a glass sheet annealed so as not to form a compressive stress layer in the surface thereof can be obtained. The annealed glass sheet can then be subjected to a strengthening process such as thermal tempering or chemical strengthening, if necessary. The strengthening process, as commonly known, leads to formation of a compressive stress layer in the surface of the glass sheet and a tensile stress layer in a deeper portion of the glass sheet.

According to a preferred embodiment of the present invention, Tuv 380 of the glass sheet can be decreased to 1.0% or less, even 0.5% or less, particularly 0.35% or less, or, as necessary, 0.27% or less. According to a preferred embodiment of the present invention, Tuv 400 of the glass sheet can be decreased to 2.2% or less, even 2.0% or less, particularly 1.8% or less, or, as necessary, 1.5% or less.

Tuv 380 and Tuv 400 tend to be decreased by thermal tempering. However, even the annealed glass sheet not having a compressive stress layer in the surface can achieve a good ultraviolet shielding property demonstrated by a Tuv 400 of 2.0% or less. The glass sheet strengthened by thermal tempering can even achieve a Tuv 400 of 1.5% or less or even 1.0% or less.

Thermal tempering (thermal strengthening) is a known process for increasing the strength of a glass sheet and is accomplished by heating the glass sheet and then blowing a gas onto the surface of the glass sheet to quench the glass sheet and form a compressive stress layer in the surface. The temperature for heating the glass sheet is typically equal to or higher than the strain point of the glass composition forming the glass sheet and equal to or lower than the softening point of the composition. The ultraviolet-shielding glass sheet of the present invention may be a 1.0- to 3.5-mm-thick strengthened glass sheet obtained by thermal tempering of the glass sheet of the present invention. The compressive stress in the surface of the strengthened glass sheet is, for example, but not limited to, 80 to 140 MPa, particularly 90 to 110 MPa.

It has been confirmed that the FeO ratio remains substantially unchanged before and after thermal tempering. It is therefore inferred that the optical property change resulting from thermal tempering is not due to a change in the FeO ratio but rather due to a shift of the absorption peak of FeO as a result of the internal structure of the heated glass composition being fixed by thermal tempering.

TG is a measure of transmission of energy of sunlight. A glass sheet having a lower TG can decrease the energy of sunlight passing therethrough; thus, such a glass sheet, when used in a vehicle or building, can reduce the temperature increase of the interior of the vehicle or building. A preferred embodiment of the present invention can provide an ultraviolet-shielding glass sheet having a TG of 5 to 45%, preferably 5 to 30%, more preferably 5 to 20%, in some cases, 5 to 15%, or even 5 to 10% and capable of effectively preventing the temperature increase of the interior of a vehicle or building.

The color of the ultraviolet-shielding glass sheet can be expressed by the chromaticity (a*,b*) in the L*a*b* color system. The value of a* is preferably −18.0 to −3.0 and more preferably −16.0 to −4.0. The value of b* is preferably −10.0 to 30.0 and more preferably −8.0 to 25.0. DW is preferably 480 to 600 and particularly preferably 500 to 580. Pe is preferably 30 or less and particularly preferably 20 or less.

An embodiment of the present invention provides an ultraviolet-shielding laminated glass sheet including a first glass sheet, a second glass sheet, and an interlayer disposed for glass lamination between the first glass sheet and the second glass sheet, wherein at least one selected from the first glass sheet and the second glass sheet is the ultraviolet-shielding glass sheet of the present invention. The laminated glass sheet may include a conventionally known glass sheet (such as a generally used, colorless soda-lime glass sheet or a conventional ultraviolet-shielding glass sheet) in addition to the ultraviolet-shielding glass sheet of the present invention.

The present invention provides a vehicle window pane including the above strengthened glass sheet or laminated glass sheet. The vehicle window pane is suitable for use, in particular, in rear side door windows, rear triangle windows, and rear windshields of automobiles.

A preferred embodiment of the present invention provides a vehicle window pane including the ultraviolet-shielding glass sheet of the present invention. A window provided with this window pane allows the exterior of a vehicle or building to be easily seen from the interior of the vehicle or building while making the interior of the vehicle or building difficult to see from the exterior of the vehicle or building, and thus offers good privacy protection. The glass sheet which enables such good privacy protection is suitable for use in rear windows of vehicles or automobiles, in particular, in rear side door windows, rear triangle windows, and rear windshields of automobiles.

[Thickness of Glass Sheet]

The thickness of the glass sheet can be selected from the range of 1 to 5 mm. The thickness is preferably 1.0 to 3.5 mm, and may be, in some cases, 1.5 to 3.3 mm, or even 1.5 to 3.0 mm.

EXAMPLES

Hereinafter, the present invention will be described in more detail with reference to examples. The following examples as well as the foregoing description are given merely for the purpose of illustrating preferred embodiments of the present invention.

Glass material batches were obtained by blending silica sand, dolomite, limestone, soda ash, salt cake, potassium carbonate, carbon, iron oxide, titanium oxide, cerium oxide, cobalt oxide, nickel oxide, zinc oxide, and selenium to give compositions of glass as shown in Table 1. Each of these batches was melted by an electric furnace at 1450° C., left in place for 4 hours, and then cast on a stainless steel plate. The glass sheet thus obtained was left in an annealing furnace held at 650° C. for 30 minutes, after which the annealing furnace was turned off to slowly cool the glass sheet to room temperature in the furnace. The rate of cooling from 650 to 550° C. in this annealing was about 0.1° C./sec. The resulting annealed glass sheet was ground to a predetermined thickness.

Next, each annealed glass sheet was subjected to thermal tempering. The thermal tempering was carried out as follows: The glass sheet was left in an electric furnace set at 700° C. for 180 seconds, after which the glass sheet was taken out of the electric furnace and quenched by exposing the glass sheet to blow of air at ordinary temperature. The rate of cooling from 650 to 550° C. in this quenching was 80 to 100° C./sec. The resulting strengthened glass sheet had a surface compressive stress ranging from 90 to 110 MPa.

For each of the glass sheets (annealed glass sheets and strengthened glass sheets), the following properties were measured: visible transmittance (YA) as measured using CIE standard illuminant A; total solar energy transmittance (TG); ultraviolet transmittances (Tuv 380 and Tuv 400) as determined according to ISO; dominant wavelength (DW) as measured using CIE standard illuminant C; excitation purity (Pe); and chromaticity (a*, b*) in the L*a*b* color system. YA and TG were calculated according to JIS. The values of the properties measured are shown in Table 2.

(Composition Analysis)

The components of the glass samples obtained were quantified by fluorescent X-ray analysis and chemical analysis. The results are shown in Table 1. In the table, the total content is not 100% for some cases, which is due to the difference in the number of significant figures and rounding off.

The glass sheets obtained in Examples had a good ultraviolet shielding property, a low to moderate visible transmittance, and even a good solar shielding property. The glass sheets obtained in Examples 1, 3, 5, and 7, in particular, had a YA of 14.5% or more and less than 20%, Tuv 400 of 1.5% or less (1.5% or less for the annealed glass sheets and 1.0% or less for the strengthened glass sheets), and TG of 15% or less, which demonstrates that the glass sheets had a visible transmittance suitable for privacy windows and good ultraviolet shielding and solar shielding properties.

TABLE 1

| | Examples | | | | | | | Comparative Examples | | | | | |
|---|---|---|---|---|---|---|---|---|---|---|---|---|---|
| | 1 | 2 | 3 | 4 | 5 | 6 | 7 | 1 | | 2 | 3 | 4 | 5 |
| Thickness of sheet (mm) | 2.9 | 2.8 | 2.8 | 2.8 | 2.9 | 2.8 | 2.6 | 2.8 | 5.8 | 2.8 | 2.6 | 2.8 | 3.1 |
| Glass composition (The unit is % unless otherwise specified.) | | | | | | | | | | | | | |
| $SiO_2$ | 69.7 | 68.8 | 69.2 | 68.0 | 70.2 | 68.3 | 70.3 | 70.2 | ← | 69.9 | 68.1 | 68.1 | 68.3 |
| $Al_2O_3$ | 1.50 | 1.20 | 1.20 | 1.00 | 1.48 | 1.10 | 1.48 | 1.52 | ← | 1.50 | 1.42 | 1.42 | 1.45 |
| MgO | 3.10 | 3.30 | 3.40 | 4.00 | 3.19 | 3.80 | 3.01 | 3.95 | ← | 3.13 | 3.92 | 3.97 | 3.95 |
| CaO | 5.86 | 6.70 | 6.90 | 8.60 | 5.96 | 8.40 | 5.96 | 8.25 | ← | 5.93 | 7.51 | 7.58 | 7.69 |
| $Na_2O$ | 13.55 | 13.1 | 13.10 | 13.00 | 13.30 | 13.00 | 13.5 | 13.55 | ← | 13.50 | 13.30 | 13.40 | 13.30 |
| $K_2O$ | 0.95 | 0.90 | 0.90 | 0.50 | 0.95 | 0.50 | 0.95 | 0.95 | ← | 0.95 | 0.64 | 0.65 | 0.70 |
| $SO_3$ | 0.20 | 0.20 | 0.20 | 0.20 | 0.16 | 0.20 | 0.14 | 0.19 | ← | 0.20 | 0.14 | 0.14 | 0.15 |
| ZnO (ppm) | 42 | 42 | 42 | 42 | 42 | 42 | 40 | 0 | ← | 42 | 0 | 0 | 0 |
| $T-Fe_2O_3$ | 2.40 | 2.00 | 2.40 | 2.75 | 2.71 | 2.75 | 2.76 | 1.45 | ← | 2.00 | 1.60 | 1.52 | 1.40 |
| FeO ratio | 24.4 | 19.8 | 23.4 | 24.5 | 26.5 | 25.6 | 26.0 | 22 | ← | 14.5 | 24.2 | 24.2 | 23.7 |
| $CeO_2$ | 0.00 | 0.50 | 0.00 | 0.00 | 0.00 | 0.00 | 0.00 | 0.00 | ← | 1.00 | 0.00 | 0.00 | 0.00 |
| $TiO_2$ | 2.70 | 3.00 | 2.70 | 1.90 | 1.80 | 1.90 | 1.65 | 0.03 | ← | 2.00 | 2.70 | 2.57 | 2.41 |
| CoO (ppm) | 350 | 350 | 350 | 200 | 280 | 400 | 310 | 190 | ← | 350 | 370 | 340 | 320 |
| NiO (ppm) | 0 | 0 | 0 | 0 | 0 | 0 | 19 | 150 | ← | 0 | 0 | 0 | 0 |
| Se (ppm) | 20 | 20 | 30 | 0 | 0 | 0 | 0 | 19 | ← | 30 | 30 | 20 | 30 |
| $2 \times [T-Fe_2O_3] + [TiO_2]$ | 7.50 | 7.00 | 7.50 | 7.40 | 7.22 | 7.40 | 7.17 | 2.93 | ← | 6.00 | 5.90 | 5.61 | 5.21 |
| Coloring components per unit area | | | | | | | | | | | | | |
| $T-Fe_2O_3$ (mg/cm$^2$) | 17.4 | 14.0 | 16.8 | 19.3 | 19.6 | 19.3 | 17.9 | 10.2 | 21.0 | 14.0 | 10.4 | 10.6 | 10.9 |
| $TiO_2$ (mg/cm$^2$) | 18.9 | 21.0 | 18.9 | 13.3 | 13.1 | 13.3 | 10.7 | 0.2 | 0.4 | 14.0 | 17.6 | 18.0 | 18.7 |
| CoO (µg/cm$^2$) | 253.8 | 245.0 | 245.0 | 140.0 | 203.0 | 280.0 | 201.5 | 133.0 | 275.5 | 245.0 | 240.5 | 238.0 | 248.0 |
| $2 \times \{T-Fe_2O_3\} + \{TiO_2\}$ | 54.4 | 49.0 | 52.5 | 51.8 | 52.3 | 51.8 | 46.6 | 20.5 | 42.5 | 42.0 | 38.4 | 39.3 | 40.4 |

TABLE 2

| | | | | | | | | (The unit is % with the exception of those of DW, a*, and b*.) | | | | | |
|---|---|---|---|---|---|---|---|---|---|---|---|---|---|
| | Examples | | | | | | | Comparative Examples | | | | | |
| | 1 | 2 | 3 | 4 | 5 | 6 | 7 | 1 | | 2 | 3 | 4 | 5 |
| Annealed glass sheet | | | | | | | | | | | | | |
| YA | 14.97 | 20.57 | 16.41 | 22.56 | 15.78 | 14.00 | 18.59 | 30.05 | 9.56 | 22.12 | 18.51 | 18.15 | 17.49 |
| TG | 10.31 | 18.32 | 11.84 | 11.86 | 8.79 | 8.84 | 10.25 | 26.52 | 8.13 | 24.33 | 18.75 | 18.11 | 17.93 |
| Tuv 380 | 0.16 | 0.31 | 0.20 | 0.24 | 0.15 | 0.22 | 0.38 | 5.21 | 0.66 | 0.55 | 0.74 | 0.75 | 0.79 |

TABLE 2-continued (The unit is % with the exception of those of DW, a*, and b*.)

| | Examples | | | | | | | Comparative Examples | | | | | |
|---|---|---|---|---|---|---|---|---|---|---|---|---|---|
| | 1 | 2 | 3 | 4 | 5 | 6 | 7 | 1 | 2 | 3 | 4 | 5 |
| DW (nm) | 553.3 | 547.5 | 554.6 | 555.2 | 539.0 | 503.0 | 541.7 | 552.8 | 553.1 | 533.8 | 568.0 | 568.6 | 569.5 |
| Pe | 15.92 | 9.7 | 15.4 | 17.70 | 11.5 | 9.3 | 11.31 | 3.3 | 6.9 | 4.2 | 18.92 | 19.7 | — |
| Tuv 400 | 0.9 | 1.8 | 1.2 | 1.4 | 0.9 | 1.2 | 1.40 | 12.7 | 2.7 | 3.1 | 2.7 | 2.7 | 2.8 |
| % T 1500 | 10.4 | 21.4 | 12.5 | 9.0 | 6.8 | 7.2 | 6.88 | — | 8.5 | 30.2 | 24.7 | 24.2 | 24.2 |
| a* | −13.200 | −11.507 | −12.511 | −15.412 | −15.970 | −15.374 | −15.46 | −3.896 | −5.110 | −7.563 | −6.034 | −5.754 | −4.894 |
| b* | 11.050 | 7.887 | 10.927 | 13.888 | 9.040 | 2.569 | 9.28 | 3.059 | 4.150 | 3.791 | 12.270 | 12.618 | 12.119 |
| | Thermal tempered glass sheet | | | | | | | | | | | | |
| YA | 15.26 | 21.02 | 16.72 | 22.66 | 15.90 | 14.19 | — | — | — | 22.84 | — | — | — |
| TG | 10.48 | 18.58 | 12.01 | 11.91 | 8.83 | 8.90 | — | — | — | 24.66 | — | — | — |
| Tuv 380 | 0.10 | 0.20 | 0.13 | 0.14 | 0.08 | 0.12 | — | — | — | 0.37 | — | — | — |
| DW (nm) | 556.2 | 551.8 | 557.3 | 557.9 | 546.7 | 511.3 | — | — | — | 541.3 | — | — | — |
| Pe | 18.50 | 11.6 | 18.0 | 20.60 | 14.7 | 7.9 | — | — | — | 5.4 | — | — | — |
| Tuv 400 | 0.7 | 1.5 | 0.9 | 1.0 | 0.7 | 0.9 | — | — | — | 2.6 | — | — | — |
| % T 1500 | 9.7 | 20.4 | 11.7 | 8.5 | 6.3 | 6.8 | — | — | — | 28.9 | — | — | — |
| a* | −13.370 | −11.722 | −12.685 | −15.449 | −16.130 | −15.781 | — | — | — | −8.142 | — | — | — |
| b* | 12.570 | 9.177 | 12.488 | 15.741 | 11.030 | 4.700 | — | — | — | 4.757 | — | — | — |

The invention claimed is:

1. An ultraviolet-shielding glass sheet, having:
a thickness of 1 to 5 mm;
an ultraviolet transmittance (Tuv 380) as determined according to ISO 9050:1990 of 1.5% or less,
an ultraviolet transmittance (Tuv 400) as determined according to ISO 13837:2008 convention A of 2.5% or less,
a visible transmittance (YA) as measured using CIE standard illuminant A according to JIS R 3106:1998 of 5 to 40%, and
a solar transmittance (TG) as determined according to JIS R 3106:1998 of 5 to 45%,
the ultraviolet-shielding glass sheet comprising a glass composition, wherein
the glass composition comprises a base composition comprising:
65 to 71 wt % $SiO_2$;
0 to 5 wt % $B_2O_3$;
1.0 to 5 wt % $Al_2O_3$;
0 to 20 wt % MgO;
0 to 20 wt % CaO;
10 to 20 wt % $Na_2O$;
0.5 to 5 wt % $K_2O$; and
0.05 to 0.5 wt % $SO_3$,
the glass composition has a RO content of 5 wt % or more, wherein the RO content is the total content of MgO, CaO, SrO, and BaO,
the glass composition comprises, as coloring components:
1.0 to 5.0 wt % $T-Fe_2O_3$ representing total iron oxide calculated as $Fe_2O_3$;
1.0 to 5.0 wt % $TiO_2$; and
50 to 600 wt. ppm cobalt oxide calculated as CoO,
the glass composition has a FeO ratio of 5 to 40%, the FeO ratio representing a weight ratio of FeO calculated as $Fe_2O_3$ to the $T-Fe_2O_3$, and
the glass composition satisfies $2\times[T-Fe_2O_3]+[TiO_2]\geq 7.0$ wherein $[T-Fe_2O_3]$ represents the content of the $T-Fe_2O_3$ in terms of wt % and $[TiO_2]$ represents the content of the $TiO_2$ in terms of wt %.

2. The ultraviolet-shielding glass sheet according to claim 1, comprising 1.0 to 4.0 wt % $T-Fe_2O_3$ as the coloring component.

3. The ultraviolet-shielding glass sheet according to claim 2, comprising 1.0 to 3.0 wt % $T-Fe_2O_3$ as the coloring component.

4. The ultraviolet-shielding glass sheet according to claim 1, comprising 1.0 to 4.0 wt % $TiO_2$ as the coloring component.

5. The ultraviolet-shielding glass sheet according to claim 4, comprising 1.0 to 3.0 wt % $TiO_2$ as the coloring component.

6. The ultraviolet-shielding glass sheet according to claim 5, comprising more than 2.2 wt % and 3.0 wt % or less $TiO_2$ as the coloring component.

7. The ultraviolet-shielding glass sheet according to claim 6, comprising 2.4 to 3.0 wt % $T-Fe_2O_3$ as the coloring component.

8. The ultraviolet-shielding glass sheet according to claim 7, wherein the glass composition comprises, as the coloring components per 1 $cm^2$ of the glass sheet:
12.5 to 35.0 mg $T-Fe_2O_3$;
12.5 to 35.0 mg $TiO_2$; and
50 to 400 μg cobalt oxide calculated as CoO, and
the glass composition satisfies $43\leq 2\times\{T-Fe_2O_3\}+\{TiO_2\}\leq 105$ wherein $\{T-Fe_2O_3\}$ represents the amount of the $T-Fe_2O_3$ in terms of mg per 1 $cm^2$ of the glass sheet and $\{TiO_2\}$ represents the amount of the $TiO_2$ in terms of mg per 1 $cm^2$ of the glass sheet.

9. The ultraviolet-shielding glass sheet according to claim 6, comprising 2.0 wt % or more and less than 2.4 wt % $T-Fe_2O_3$ as the coloring component.

10. The ultraviolet-shielding glass sheet according to claim 9, wherein the glass composition comprises, as the coloring components per 1 $cm^2$ of the glass sheet:
12.5 to 35.0 mg $T-Fe_2O_3$;
12.5 to 35.0 mg $TiO_2$; and
50 to 400 μg cobalt oxide calculated as CoO, and
the glass composition satisfies $43\leq 2\times\{T-Fe_2O_3\}+\{TiO_2\}\leq 105$ wherein $\{T-Fe_2O_3\}$ represents the amount of the $T-Fe_2O_3$ in terms of mg per 1 $cm^2$ of the glass sheet and $\{TiO_2\}$ represents the amount of the $TiO_2$ in terms of mg per 1 $cm^2$ of the glass sheet.

11. The ultraviolet-shielding glass sheet according to claim 5, comprising 1.0 to 2.2 wt % $TiO_2$ as the coloring component.

12. The ultraviolet-shielding glass sheet according to claim 11, comprising, as the coloring components:
  2.4 to 3.0 wt % T-$Fe_2O_3$; and
  300 to 600 wt. ppm cobalt oxide calculated as CoO.

13. The ultraviolet-shielding glass sheet according to claim 12, comprising 305 to 450 wt. ppm cobalt oxide calculated as CoO as the coloring component.

14. The ultraviolet-shielding glass sheet according to claim 1, further comprising 0 to 200 wt. ppm ZnO in the base composition.

15. The ultraviolet-shielding glass sheet according to claim 1, further comprising 0 to 2 wt. ppm Se as the coloring component, wherein
  the FeO ratio is 22 to 32%.

16. The ultraviolet-shielding glass sheet according to claim 1, further comprising 5 to 50 wt. ppm Se as the coloring component, wherein
  the FeO ratio is 18 to 28%.

17. The ultraviolet-shielding glass sheet according to claim 1, comprising a compressive stress layer formed by thermal tempering in a surface thereof, the ultraviolet-shielding glass sheet having a thickness of 1.0 to 3.5 mm.

18. The ultraviolet-shielding glass sheet according to claim 17, having a Tuv 400 of 1.5% or less.

19. A vehicle window pane, comprising the ultraviolet-shielding glass sheet according to claim 17.

20. The ultraviolet-shielding glass sheet according to claim 1, comprising no compressive stress layer formed by thermal tempering in a surface thereof, the ultraviolet-shielding glass sheet having a Tuv 400 of 2.0% or less.

21. An ultraviolet-shielding laminated glass sheet comprising:
  a first glass sheet, a second glass sheet, and an interlayer disposed for glass lamination between the first glass sheet and the second glass sheet, wherein
  at least one selected from the first glass sheet and the second glass sheet is the ultraviolet-shielding glass sheet according to claim 1.

22. A vehicle window pane, comprising the ultraviolet-shielding laminated glass sheet according to claim 21.

23. The ultraviolet-shielding glass sheet according to claim 1, comprising 3 to 20 wt % MgO and 5 to 20 wt % CaO as the basic component.

24. The ultraviolet-shielding glass sheet according to claim 1, wherein the glass composition is substantially free of SrO and BaO.

25. The ultraviolet shielding glass according to claim 1, wherein the RO content is 20 wt % or less.

* * * * *